US012172448B2

(12) United States Patent
Shimamura

(10) Patent No.: US 12,172,448 B2
(45) **Date of Patent: *Dec. 24, 2024**

(54) LIQUID STORAGE CONTAINER AND LIQUID DISCHARGE APPARATUS

(71) Applicant: CANON KABUSHIKI KAISHA, Tokyo (JP)

(72) Inventor: Ryo Shimamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,687

(22) Filed: Oct. 31, 2023

(65) Prior Publication Data

US 2024/0059072 A1 Feb. 22, 2024

Related U.S. Application Data

(63) Continuation of application No. 17/569,439, filed on Jan. 5, 2022, now Pat. No. 11,840,093.

(30) Foreign Application Priority Data

Feb. 22, 2021 (JP) ................................ 2021-026329

(51) Int. Cl.
*B41J 2/175* (2006.01)
*B41J 29/13* (2006.01)

(52) U.S. Cl.
CPC ............ *B41J 2/1754* (2013.01); *B41J 29/13* (2013.01); *B41J 2/17509* (2013.01)

(58) Field of Classification Search
CPC .... B41J 2/175; B41J 2/17503; B41J 2/17506; B41J 2/17509; B41J 2/17513; B41J 2/1754; B41J 29/02; B41J 29/13
See application file for complete search history.

(56) References Cited

U.S. PATENT DOCUMENTS 8,454,139 B2 6/2013 Ishizawa et al. ............... 347/85
8,529,035 B2 9/2013 Tsukamoto et al. ............ 347/86
9,724,929 B2 8/2017 Yoshii et al. .......... B41J 2/1752
(Continued)

FOREIGN PATENT DOCUMENTS

CN 209506521 U 10/2019
JP 2010-214693 9/2010
(Continued)

OTHER PUBLICATIONS

Japanese Office Action issued Sep. 10, 2024 in counterpart Japanese Patent Appln. No. 2021-026329.

*Primary Examiner* — Anh T Vo
(74) *Attorney, Agent, or Firm* — Venable LLP

(57) ABSTRACT

Disclosed is a method for suppressing adhesion of a liquid to the plug member. A disclosed liquid storage container has a storage chamber for storing a liquid, a supply port having a hollow cylindrical portion protruding from the storage chamber and being capable of supplying the liquid to the storage chamber, and a plug member detachably attached to the supply port. The plug member has a plug portion inserted into the hollow cylindrical portion to plug the supply port. On the plug portion, a first water repellent film having water repellency is formed on an exposed surface exposed at least to the inside of the hollow cylindrical portion in a portion inserted into the storage chamber.

13 Claims, 10 Drawing Sheets

(56) References Cited

U.S. PATENT DOCUMENTS

| | | | |
|---|---|---|---|
| 9,914,305 B2 | 3/2018 | Orihara et al. | B41J 2/17523 |
| 10,093,105 B2 * | 10/2018 | Shimamura | B41J 2/1752 |
| 10,112,403 B2 | 10/2018 | Ikebe et al. | B41J 2/1752 |
| 10,160,222 B2 | 12/2018 | Shiba et al. | B41J 2/17566 |
| 10,391,776 B2 | 8/2019 | Hayashi et al. | B41J 2/17513 |
| 10,399,346 B2 | 9/2019 | Arai et al. | B41J 2/175 |
| 10,399,347 B2 | 9/2019 | Miyashita et al. | B41J 2/17506 |
| 10,427,412 B2 | 10/2019 | Okude et al. | B41J 2/03 |
| 10,461,308 B2 | 10/2019 | Kobayashi | H01M 2/365 |
| 10,538,092 B2 | 1/2020 | Miyashita et al. | B41J 2/17523 |
| 10,611,162 B2 | 4/2020 | Ikebe et al. | B41J 2/17523 |
| 10,618,300 B2 | 4/2020 | Shimamura et al. | B41J 2/17553 |
| 10,675,882 B2 | 6/2020 | Shiba et al. | B41J 2/17566 |
| 10,843,474 B2 | 11/2020 | Arai et al. | B41J 29/13 |
| 11,192,383 B2 | 12/2021 | Shimamura et al. | B41J 2/17553 |
| 11,840,093 B2 * | 12/2023 | Shimamura | B41J 2/17523 |
| 2011/0209335 A1 | 9/2011 | Yamamoto et al. | 29/505 |
| 2022/0048295 A1 | 2/2022 | Shimamura et al. | B41J 29/13 |

FOREIGN PATENT DOCUMENTS

| | | |
|---|---|---|
| JP | 2012-020497 | 2/2012 |
| JP | 2017077661 A | 4/2017 |
| JP | 2017196895 A | 11/2017 |

* cited by examiner

LIQUID STORAGE CONTAINER AND LIQUID DISCHARGE APPARATUS

This application is a continuation of application Ser. No. 17/569,439 filed Jan. 5, 2022, now issued as U.S. Pat. No. 11,840,093 on Dec. 12, 2023; and claims priority under 35 U.S.C. § 119 to Japan Application JP 2021-026329 filed in Japan on Feb. 22, 2021; and the contents of all of which are incorporated herein by reference as if set forth in full.

BACKGROUND OF THE INVENTION

Field of the Invention

The present disclosure relates to a liquid storage container capable of replenishing liquid, and a liquid discharge apparatus equipped with the same.

Description of the Related Art

In general, a liquid discharge apparatus for discharging a liquid such as ink comprises a liquid storage container for storing the liquid. Some liquid storage containers can replenish the liquid.

Japanese Patent Application Laid-Open No. 2012-20497 discloses a liquid storage container into which a liquid can be replenished. The liquid storage container according to Japanese Patent Application Laid-Open No. 2012-20497 has a storage chamber for storing the liquid, a supply port for supplying the liquid into the storage chamber, and a plug member for closing the supply port. The plug member is detachably attached to the supply port. When replenishing the liquid, the plug member is detached from the supply port and the liquid is injected into the storage chamber from the supply port.

However, in the liquid storage container disclosed by Japanese Patent Application Laid-Open No. 2012-20497, the liquid may adhere to the plug member plugging the supply port. For example, the liquid may adhere to the plug member due to the fluctuation of the liquid in the storage chamber caused when the liquid discharge apparatus is moved. Therefore, the liquid adhering to the plug member may scatter to the outside due to the reaction or impact when the plug member is removed from the supply port, or the fingers or the like may be contaminated by the liquid adhering to the plug member after opening the supply port.

The present disclosure relates to a device which has been made in view of the above problems, and it is an object of the present disclosure to suppress adhesion of liquid to the plug member.

SUMMARY OF THE INVENTION

In order to achieve the above object, a liquid storage container according to one aspect of the present disclosure comprises: a storage chamber configured to storage liquid; a supply port configured to have a hollow cylindrical portion protruding from the storage chamber and be capable of supplying the liquid to the storage chamber; and a plug member detachably attached to the supply port, wherein the plug member has a plug portion inserted into the hollow cylindrical portion to plug the supply port, and the plug portion has a first water repellent film having water repellency formed on an exposed surface exposed at least inside the storage chamber in a portion inserted into the hollow cylindrical portion. A liquid storage container according to another aspect of the present disclosure comprises: a storage chamber configured to store a liquid; a supply port configured to have a hollow cylindrical portion protruding from the storage chamber and be capable of supplying the liquid to the storage chamber; and a plug member detachably attached to the supply port, wherein the plug member has a plug portion inserted into the hollow cylindrical portion to plug the supply port, and a cover portion formed integrally with the plug portion and covering the supply port from an outside of the storage chamber in a state where the plug portion is inserted into the hollow cylindrical portion, and a water repellency of an exposed surface of a portion inserted into the hollow cylindrical portion of the plug member, the exposed surface being exposed at least inside the storage chamber, is greater than the water repellency of the cover portion.

Further features of the present invention will become apparent from the following description of exemplary embodiments with reference to the attached drawings.

DESCRIPTION OF THE EMBODIMENTS

Embodiments of the present disclosure will now be described in detail with reference to the drawings. However, the components described in the embodiments are merely examples, and the scope of the present disclosure is not intended to be limited to them.

First Embodiment

Figure 1:
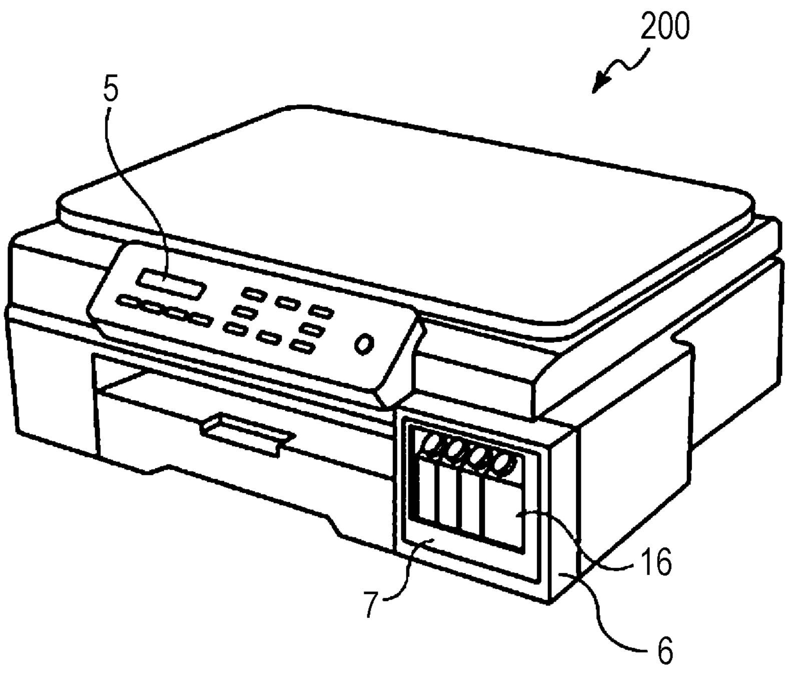
FIG. 1 is a perspective view showing an appearance of a liquid discharge apparatus to which a liquid storage container of the present invention is applicable.
Figure 2:
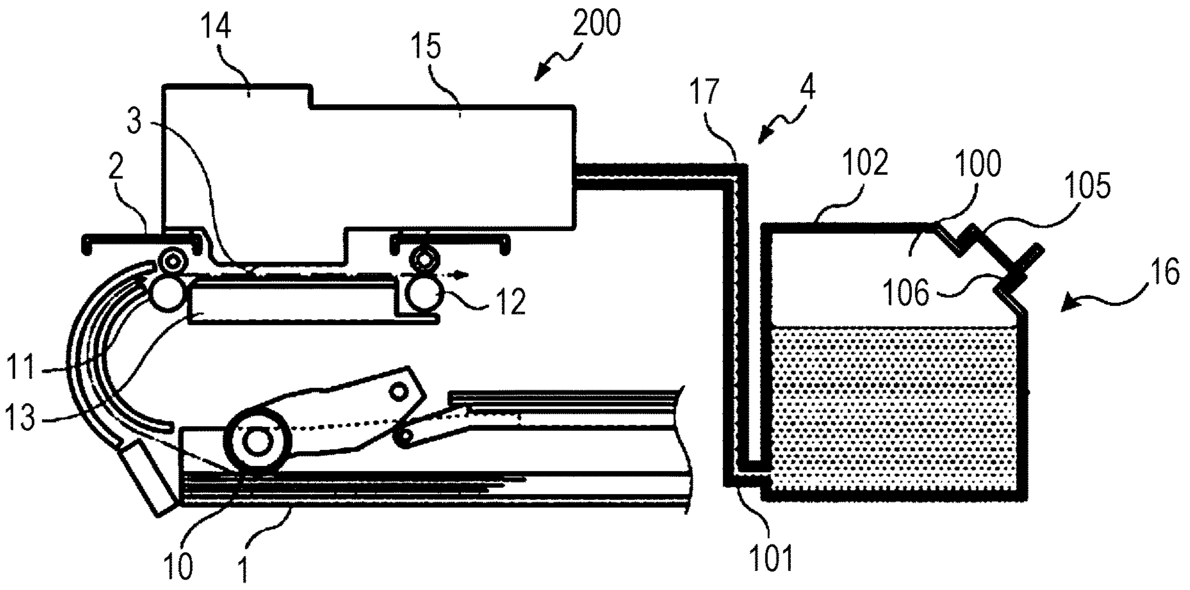
FIG. 2 is a schematic diagram for explaining the configuration of the liquid discharge apparatus shown in FIG. 1.

Firstly, a liquid discharge apparatus to which a liquid storage container of the first embodiment of the present disclosure is applicable will be described. FIG. 1 is a perspective view showing an external appearance of a liquid discharge apparatus. FIG. 2 is a schematic diagram for explaining the configuration of the liquid discharge apparatus shown in FIG. 1. Referring to FIGS. 1 and 2, a liquid discharge apparatus 200 includes a feeding section 1, a conveyance section 2, a discharge section 3, a liquid supply section 4, a display section 5, and a liquid housing section 6. The feeding section 1 is provided with a tray in which a plurality of sheet like recording papers are stacked and stored, and a feeding roller 10 for separating the recording papers stored in the tray one by one and feeding them to the conveyance section 2.

The conveyance section 2 has a conveying roller 11, a paper discharge roller 12, and a platen 13. The platen 13 is disposed between the conveying roller 11 and the paper discharge roller 12. The conveying roller 11 conveys the recording paper supplied from the feeding section 1 onto the platen 13. The platen 13 holds the recording paper. The paper discharge roller 12 discharges the recording paper conveyed on the platen 13. A liquid discharge head 15 includes the discharge section 3 for discharging a liquid such as ink. A carriage 14 is positioned above the platen 13, and is movable in a direction (sub-scanning direction) intersecting a conveyance direction (main scanning direction) of the recording paper. The liquid discharge head 15 is mounted on the carriage 14, and the discharge section 3 discharges liquid toward the recording paper on the platen 13. Thus, an image based on the image information can be formed on the recording paper.

A liquid storage container 16 is a liquid storage container of the first embodiment of the present disclosure. The liquid storage container 16 includes a storage chamber 100 for storing a liquid, an atmospheric communication port 102, a plug member 105, and a supply port 106. The supply port 106 is configured to be capable of providing the liquid to the storage chamber 100. The plug member 105 is detachably attached to the supply port 106. The storage chamber 100 is fluidly connected to the liquid discharge head 15 via the liquid supply section 4. The liquid supply section 4 has a flow passage 101 and a flexible supply tube 17. The liquid is supplied from the storage chamber 100 to the liquid discharge head 15 through the passage 101 and the supply tube 17 in accordance with the amount of the liquid discharged by the discharge section 3. Here, liquids of 4 colors (for example, black, magenta, cyan, and yellow) are used, and the liquid storage container 16, the flow passage 101, and the supply tube 17 are provided for each color of the liquid. The color of the liquid is an example, and the liquid used is not limited to four colors. A single color liquid may be used, or two or more colors of liquid may be used.

A display section 5 displays information (operation status, operation items, menus, etc.) necessary for operating the liquid discharge apparatus 200. The liquid housing section 6 stores the liquid storage container 16. The liquid housing section 6 is provided with an openable/closable cover 7. The liquid can be replenished to the liquid storage container 16 stored in the liquid housing section 6 with the cover 7 open.

Figure 3:
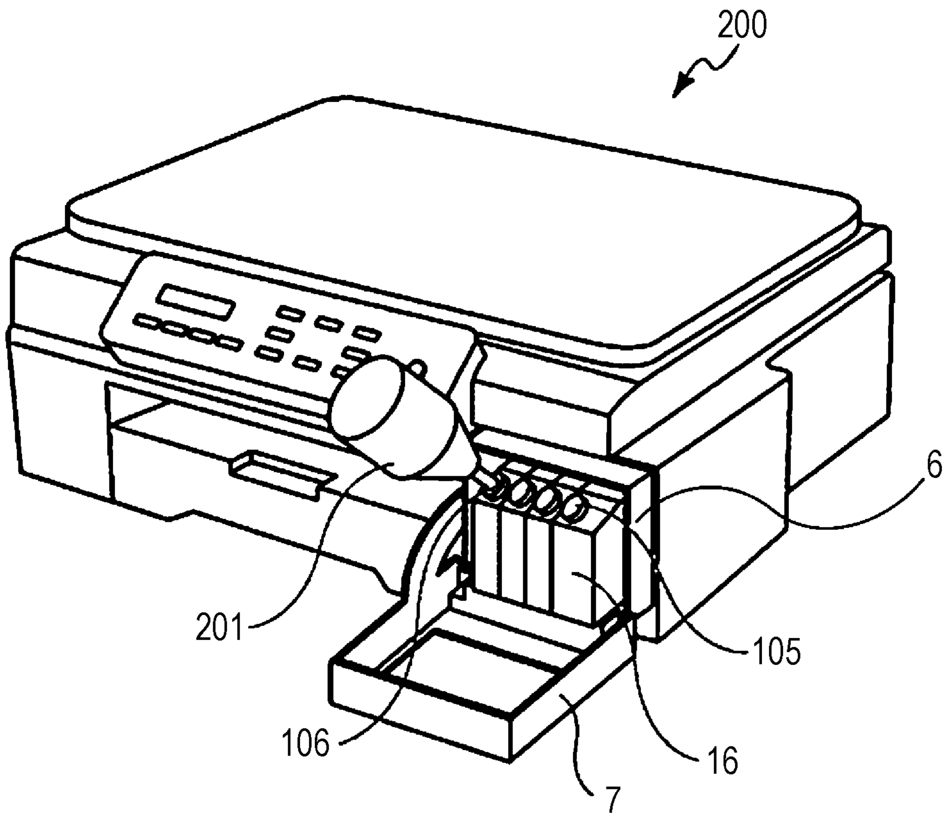
FIG. 3 is a schematic diagram illustrating replenishment of a liquid into a liquid storage container.

FIG. 3 is a schematic view for explaining replenishment of the liquid storage container 16 housed in the liquid housing section 6. As shown in FIG. 3, when the liquid is to be replenish, the cover 7 is opened to detach the plug member 105 from the supply port 106, and the liquid is supplied from the supply port 106 to the storage chamber 100 using the liquid replenishing container 201. In the present embodiment, the liquid storage container 16 is housed in the liquid housing section 6 of the apparatus main body, but the present disclosure is not limited thereto. If the liquid can be supplied to the liquid discharge head 15, the liquid storage container 16 may be provided outside the apparatus body.

Figure 4:
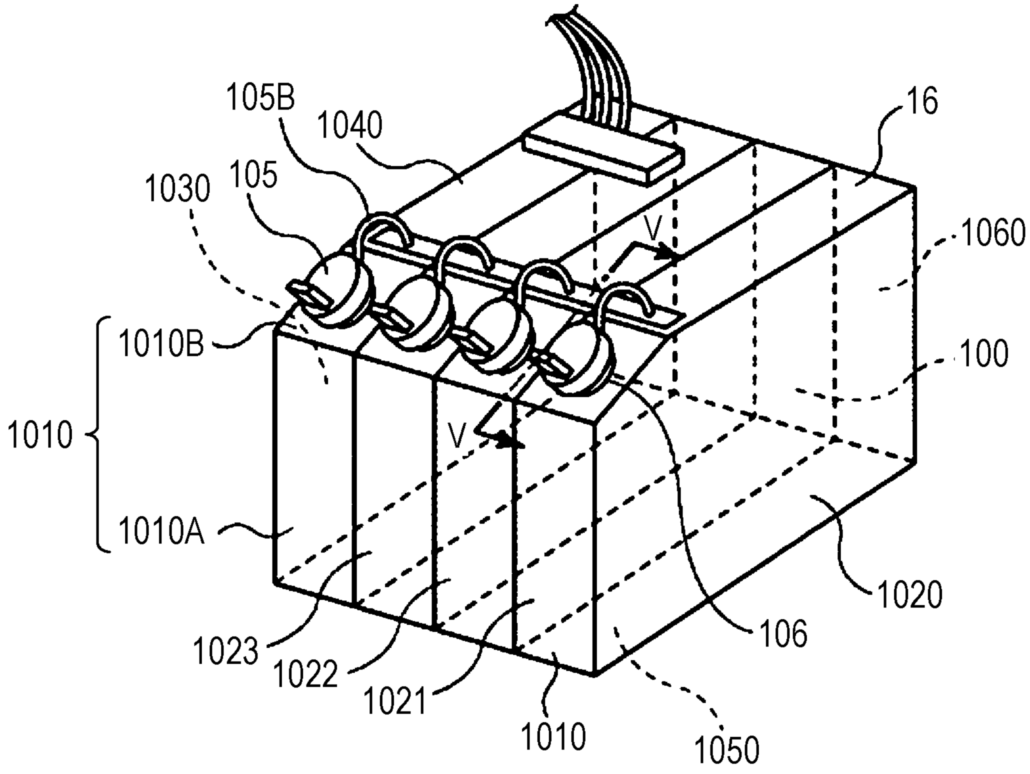
FIG. 4 is a perspective view showing a schematic configuration of a liquid storage container according to a first embodiment of the present invention.

FIG. 4 is a perspective view showing a schematic configuration of the liquid storage container 16 of this embodiment. Referring to FIG. 4, the liquid storage container 16 is formed of a synthetic resin such as polypropylene and has a generally rectangular parallelepiped shape. The liquid storage container 16 has a front wall 1010, a right wall 1020, a left wall 1030, an upper wall 1040, and a lower wall 1050. The front wall 1010 has a vertical wall 1010A and an inclined wall 1010B. The vertical wall 1010A extends generally in the vertical direction from the lower wall 1050. The inclined wall 1010B extends from the upper end of the vertical wall 1010A toward the upper wall 1040 and is inclined with respect to the upper wall 1040. The inclined wall 1010B is inclined so that the front side is low and the rear side is high in the longitudinal direction. The supply port 106 is formed on the inclined wall 1010B.

The rear surface of the liquid storage container 16 is open, and a film 1060 is welded to the open surface. The film 1060, the front wall 1010, the right wall 1020, the left wall 1030, the upper wall 1040 and the lower wall 1050 form the storage chamber 100. In the present embodiment, three intercolor walls 1021, 1022, and 1023 are provided for storing the four colors of liquid in the storage chamber 100. In other words, the storage chamber 100 is divided into 4 liquid chambers by intercolor walls 1021, 1022, and 102. The supply port 106 and the plug member 105 are provided for each liquid chamber.

Figure 5A:
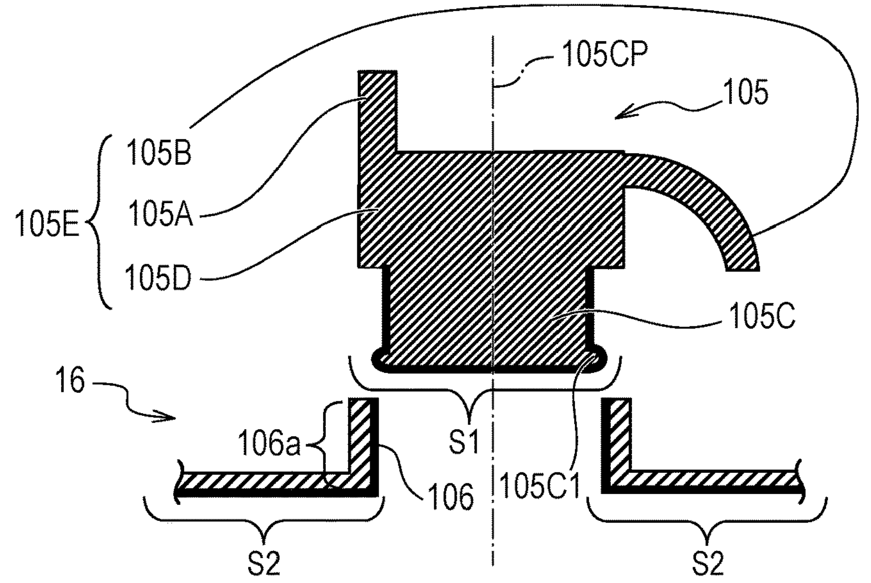
FIGS. 5A, 5B and 5C are schematic diagrams each illustrating a configuration of a plug member of a liquid storage container, according to a first embodiment of the present invention.
Figure 5B:
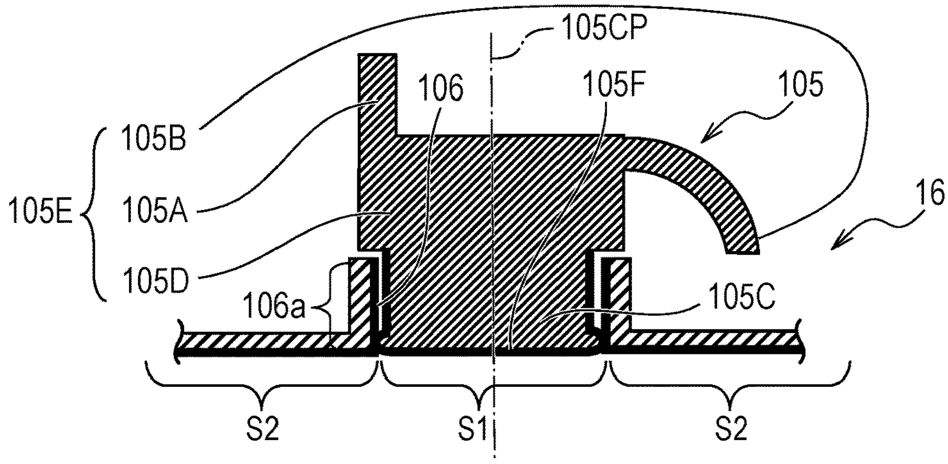
Figure 5C:
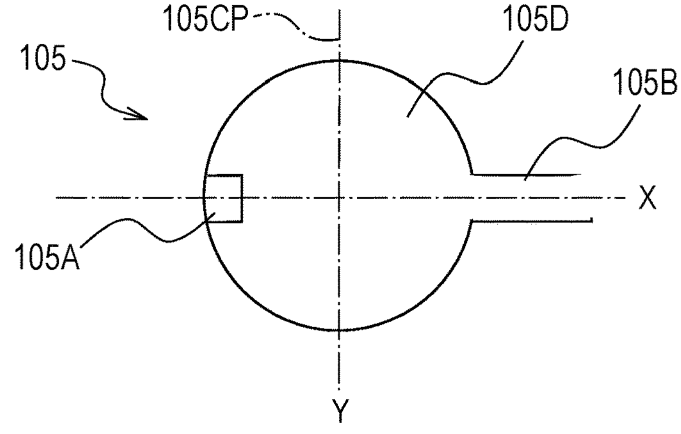

FIGS. 5A to 5C are diagrams for explaining the configuration of the plug member 105 of the liquid storage container 16 of this embodiment. FIG. 5A is a schematic diagram showing a state where the plug member 105 is detached from the supply port 106. FIG. 5B is a schematic diagram showing a state where the plug member 105 is attached to the supply port 106. FIG. 5C is a top view of the plug member 105 attached to the supply port 106. FIGS. 5A and 5B correspond to cross sectional views in V-V section of FIG. 4.

As shown in FIGS. 5A and 5B, the plug member 105 has a body portion 105E and a plug portion 105C. The body portion 105E has a projection portion 105A, a support portion 105B and a cover portion 105D. The plug portion 105C is inserted into the supply port 106 to plug the supply port 106. Here, the plug portion 105C is press-fitted to the supply port 106 so as to be detachably attached. The supply port 106 has a hollow cylindrical portion **106*a* protruding from the storage chamber 100, and an entire of the plug portion 105C is inserted into the hollow cylindrical portion 106*a*. Here, the hollow cylindrical portion 106*a* is a hollow cylindrical portion having a circular cross-sectional shape. However, the supply port 106 is not limited to a cylindrical shape, and may have other shapes of hollow tube or pipe. In order to obtain a sealing property capable of preventing leakage of liquid from the supply port 106, the entire of the plug member 105 or at least the plug portion 105C is preferably formed of a flexible member such as rubber. The plug portion 105C has a lip portion 105C1 at a tip part (a part forming the lowest surface) of a part inserted into the supply port 106. Since the supply port 106 is sealed by elastic deformation of the lip portion 105C1, liquid leakage can be prevented. The height and width of the lip portion 105C1** can be arbitrarily set.

The cover portion 105D is formed integrally with the plug portion 105C. The cover portion 105D covers the supply port 106 from the outside of the storage chamber 100 in a state where the entire of the plug portion 105C inserted into the hollow cylindrical portion **106*a*. The support portion 105B supports a part of the cover portion 105D in a state where the plug member 105 is detached from the supply port 106. Here, the support portion 105B is formed of a string shaped member, one end of which is attached to the upper portion of the cover portion 105D, and the other end of which is attached to a fixing portion provided on the upper wall 1040. If the plug member 105 can be supported, the support portion 105B may be attached to any portion. For example, the other end of the support portion 105B may be attached to a portion other than a liquid storage container 16, such as the liquid discharge apparatus 200**.

The projection portion 105A projects from the upper surface of the cover portion 105D. The plug member 105 can be detached from the supply port 106 by pinching and pulling the projection portion 105A. Note that the shape of the projection portion 105A is not limited to the shape shown in the drawing. For example, the projection portion 105A may be a rectangular parallelepiped portion projecting from the upper surface of the cover portion 105D. Further, the distal end of the projection portion 105A may have a protruding shape such as a rectangular parallelepiped, an uneven shape, a spherical shape, or the like. As shown in FIG. 5C, the top surface of the cover portion 105D has a circular shape. The plug portion 105C has a center line 105CP coincident with the center line of the hollow cylindrical portion 106*a* in a state where the plug member 105 is attached to the hollow cylindrical portion 106*a*. The center line 105CP passes through the center of the upper surface of the cover portion 105D. The projection portion 105A is located on the opposite side of the support portion 105B across the center line 105CP (or center). For example, the virtual straight line X orthogonal to the center line 105CP (or passing through the center) may be set, and the projection portions 105A and the support portions 105B may be arranged at both ends on the virtual straight line X. A virtual straight line Y passing through the center line 105CP and orthogonal to the virtual straight line X may be set, and the projection portion 105A may be arranged on one side and the support portion 105B may be arranged on the other side across the virtual straight line Y.

Figure 6:
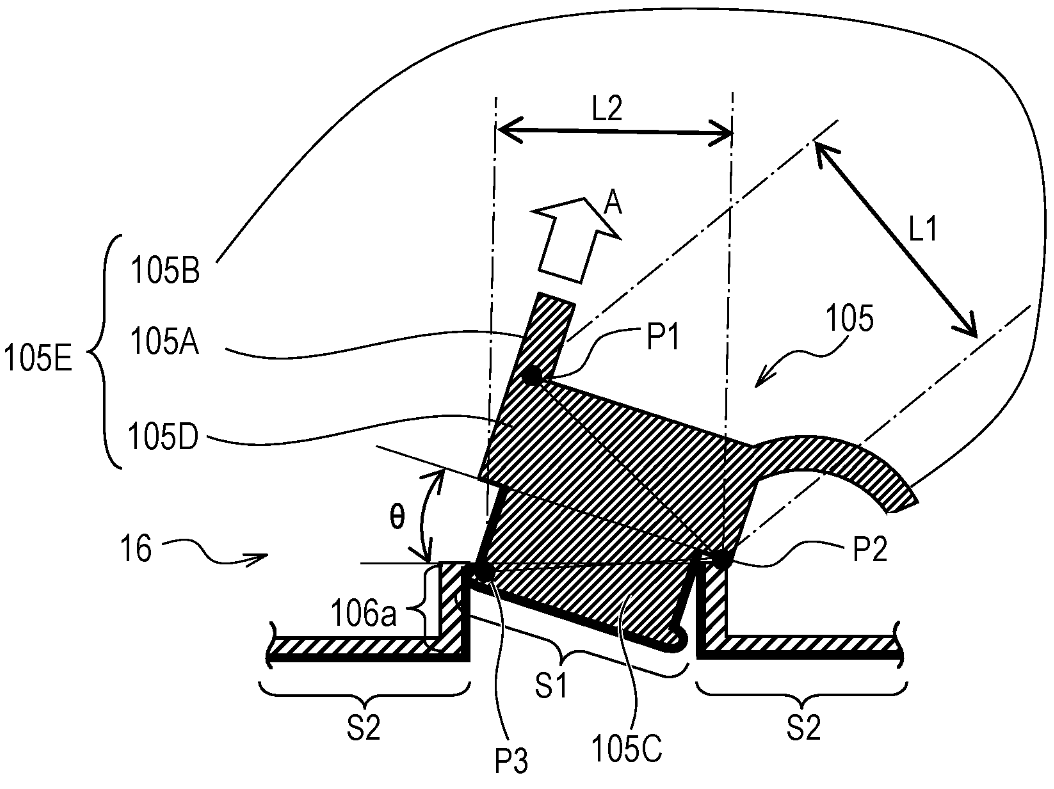
FIG. 6 is a schematic diagram showing a state where the plug member shown in FIGS. 5A to 5C is removed from a supply port.

FIG. 6 schematically shows a state of the plug member 105 at a time when the plug member 105 is detached from the supply port 106. When projection portion 105A is pinched by fingers and pulled in the direction of an arrow A, the plug member 105 is deformed while tilting at an angle θ. A base part of projection portion 105A is defined as a force application point P1, a part (fixed point) where the plug member 105 abuts on the upper part of the supply port 106 is defined as a fulcrum P2, and a part where the plug member 105 abuts on the inner wall surface of a supply port 106 and located at a side opposite to the fulcrum P2 is defined as an action point P3. Since the plug member 105 rotates around the fulcrum P2, the plug member 105 can be easily detached from the supply port 106 by the principle of leverage. The distance from the force application point P1 to the fulcrum P2 is L1, and the distance from the action point P3 to the fulcrum P2 is L2. By making the distance L1 larger than the distance L2, a small motion applied to the force application point P1 can be converted into a larger motion at the action point P3. Therefore, from the viewpoint of utilizing the principle of leverage, the projection portion 105A is preferably provided at a position satisfying L1>L2, for example, at a position opposite to the support portion 105B.

Referring again to FIGS. 5A and 5B, on the plug portion 105C, a first water repellent film S1 having water repellency is formed on an exposed surface 105F exposed at least inside the storage chamber 100 among a part of the plug portion 105C inserted into the hollow cylindrical portion 106*a*. The exposed surface 105F includes a tip surface of the plug portion 105C. In the present embodiment, the first water repellent film S1 is formed on the entire surface of the portion of the plug portion 105C inserted into the hollow cylindrical portion 106*a*. For example, the first water repellent film S1 is formed by performing water repellent treatment by forming (coating) a water repellent film composed of a silicone-based compound, a fluorine compound or the like on the surface. Specifically, a portion of the plug member 105 other than the plug portion 105C is masked and water repellent treatment is selectively performed on the surface of the plug portion 105C to form the first water repellent film S1. It is preferable that the first water repellent film S1 is formed on a portion of the plug portion 105C inserted into the hollow cylindrical portion 106*a* where there is a possibility that a liquid adheres thereto. The lower the surface tension of the solid and the higher the surface tension of the liquid, the more the surface tension of the liquid will prevail when the liquid adheres to the solid surface, causing the liquid to be pulled inward and become more spherical on the solid surface. Generally, the surface tension of a liquid such as ink is lower than that of water, but by applying a water repellent treatment to the surface on the solid side to remarkably lower the surface tension than that of the liquid, the liquid repellent performance (water-repellent) can be imparted to the solid surface. In the present embodiment, by forming the first water repellent film S1 on the plug portion 105C which is the solid side, it is possible to suppress adhesion of the liquid to a plug member 105.

A second water repellent film S2 having water repellency is formed on the inner wall surface of the hollow cylindrical portion 106*a* and the region adjacent to the supply port 106 on the inner wall surface of the storage chamber 100 by selectively performing the water repellent treatment. Thus, by forming the second water repellent film S2 on the inner wall surface of the hollow cylindrical portion 106*a* and the adjacent region of the inner wall surface of the storage chamber 100, it is possible to prevent the liquid from remaining on the supply port 106 and its peripheral portion when replenishing the liquid or detaching the plug. From the viewpoint of suppressing the residual liquid, the water repellency of the second water repellent film S2 may be relatively higher than that of the other regions on the inner wall surface of the storage chamber 100. However, in order to preferentially suppress adhesion of liquid to the plug member 105, for example, the relationship between the height of water repellency (water repellency) of the first water repellent film S1 and the second water repellent film S2 is S1≥S2. Here, the height of water repellency (water repellency) can be evaluated using, for example, the contact angle of the liquid with respect to the solid surface. The "contact angle" is defined as the angle between the solid and the liquid on the side containing the liquid, and the higher the angle, the higher the water repellency.

In general, a water repellent treatment may be applied a plurality of times so as to form a water repellent film by a coating process obtaining a low roughness and a high smoothness. The height of water repellency (water repellency) of the first water repellent film S1 and the second water repellent film S2 can be arbitrarily adjusted. Since it is easier to manufacture the films of which water repellency relation is S1>S2 than that of which water repellency relation is S1=S2, the relation of water repellency, S1>S2 is preferably selected. In the present embodiment, the water repellent film is formed on both the inner wall surface of the hollow cylindrical portion 106*a* and the side surface of the plug portion 105C (the surface facing the inner wall surface of the hollow cylindrical portion 106*a*), but the water repellent film may be formed on either surface. However, from the viewpoint of suppressing adhesion of the liquid to a plug member 105, it is preferable that the first water repellent film S1 is always formed on the distal end portion (portion exposed inside the storage chamber 100) of the plug portion 105C.

As shown in FIG. 5B, while the entire plug portion 105C is inserted into the hollow cylindrical portion 106*a*, water repellent surfaces continuously along the inner wall surface of a storage chamber 100 are formed. Specifically, the first water repellent film S1 formed on the surface of the plug portion 105C exposed to inside the storage chamber 100 and the second water repellent film S2 formed on the inner wall surface of the storage chamber 100 form a water repellent surface that continues along the inner wall surface. In this water repellent surface, if a recess exists at the boundary between the first water repellent film S1 and the second water repellent film S2, the liquid may remain in the recess. From the viewpoint of suppressing adhesion of the liquid to the plug member 105, it is not preferable that such a recess is present in the water repellent surface. In the present embodiment, the exposed surface 105F (tip surface) exposed to inside the storage chamber 100 of the plug portion 105C is flush with the inner wall surface of the storage chamber 100. In this case, since the exposed surface 105F (tip surface) of the plug portion 105C and the inner wall surface of the storage chamber 100 are both planar, the water repellent film formed of the first water repellent film S1 formed on the exposed surface 105F and the second water repellent film S2 formed on the inner wall surface make a substantial plane. Therefore, it is possible to suppress the occurrence of the recess where the liquid may remain at the boundary between the first water repellent film S1 and the second water repellent film S2. The exposed surface 105F (tip surface) exposed to the inside of the storage chamber 100 of the plug portion 105C may extend inward from the inner wall surface of the storage chamber 100. According to this configuration, it is possible to reliably suppress the formation of the recess in which liquid may remain at the boundary between the first water repellent film S1 and the second water repellent film S2.

In the liquid storage container 16 of the present embodiment described above, the first water repellent film S1 is formed on at least the surface (tip portion) of the plug portion 105C exposed inside the storage chamber 100 among a portion inserted into the hollow cylindrical portion 106*a*. Even when the liquid touches the plug portion 105C by the fluctuation of the liquid in the storage chamber 100, the liquid is bounced by the first water repellent film S1. Thus, adhesion of the liquid to the plug member 105 can be suppressed. Therefore, the scattering of the liquid at the time of opening or detaching the plug can be suppressed, and the contamination of the fingers or the like by the liquid can be suppressed after opening the plug.

Further, the portion where the first water repellent film S1 is formed and the portion where the second water repellent film S2 is formed can be combined in the following variations.

(Variation 1) The first water repellent film S1 is formed only at the tip of the plug portion 105C (formed only on the exposed surface 105F exposed inside the storage chamber 100).

(Variation 2) One or more of the following configurations (2a) to (2c) is combined with the above variation 1:

- (2a) The first water repellent film S1 is formed on the side surface of the plug portion 105C (formed on the surface facing the inner wall surface of the hollow cylindrical portion 106*a*);
- (2b) The second water repellent film S2 is formed on the inner wall surface of the hollow cylindrical portion 106*a*; and
- (2c) The second water repellent film S2 is formed on a region on the inner wall surface of the storage chamber 100, adjacent the inner wall surface of a supply port 106.

According to the combination described above, in addition to suppressing adhesion of the liquid to the plug member 105, it is possible to prevent the liquid from remaining in a supply port 106 or its peripheral portion when replenishing the liquid or opening the plug.

In the present embodiment, the supply port 106 is provided on the inclined surface inclined with respect to the liquid surface (or horizontal surface), but the present disclosure is not limited thereto. The plane on which the supply port 106 is provided may be a plane parallel to the liquid surface (or horizontal plane). Here, the inclined surface is, for example, an inclined surface inclined with respect to the horizontal direction when the liquid discharge apparatus 200 houses the liquid storage container 16 is installed on a horizontal plane. Further, the plug member 105 may be configured such that the water repellency of the exposed surface 105F exposed at least inside the storage chamber 100, in the portion of the plug portion 105C inserted into the hollow cylindrical portion 106*a* is greater than the water repellency of the cover portion 105D. This configuration can also suppress adhesion of the liquid to the plug member 105.

Second Embodiment

Figure 7A:
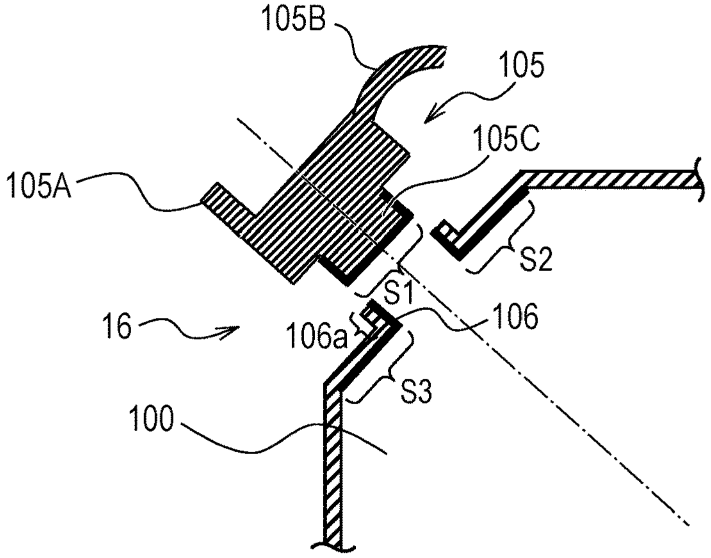
FIGS. 7A, 7B and 7C are schematic diagrams each illustrating a configuration of a plug member of a liquid storage container, according to a second embodiment of the present invention.
Figure 7B:
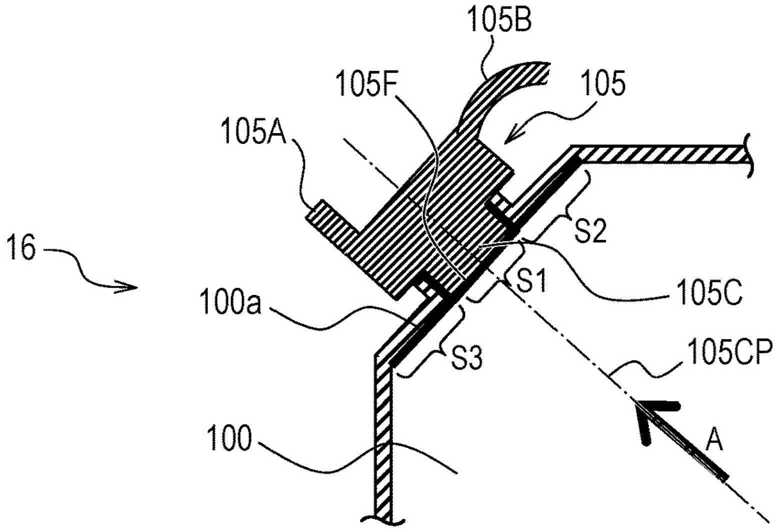
Figure 7C:
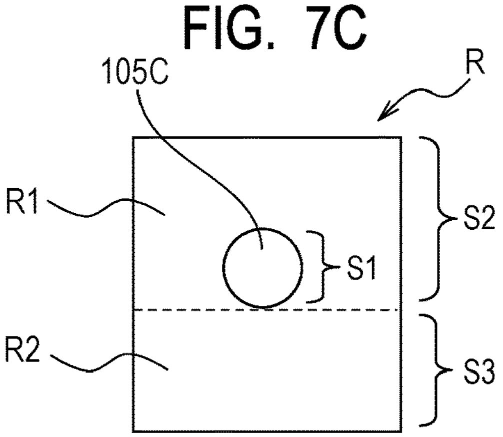

In a liquid storage container according to the second embodiment of the present disclosure, the structure of the water repellent film is different from that of the first embodiment. The structure is the same as that of the first embodiment except for the water repellent film. The same components are denoted by the same reference numerals as in the first embodiment, and a detailed description thereof will be omitted here. FIGS. 7A to 7C are diagrams for explaining the configuration in a state where a plug member 105 is detached from a supply port 106 of a liquid storage container 16 according to the present embodiment. FIG. 7A is a schematic diagram showing a state where the plug member 105 is detached from the supply port 106. FIG. 7B is a schematic diagram showing a state where the plug member 105 is attached to the supply port 106. FIG. 7C is a plan view showing the periphery of the supply port 106 on the inner wall surface of the liquid storage container 16 shown in FIG. 7B, viewed from the direction of the arrow A. FIGS. 7A and 7B correspond to cross sectional views in V-V section of FIG. 4.

As shown in FIGS. 7A and 7B, the inner wall surface of the storage chamber 100 includes an inclined surface 100*a* inclined with respect to the liquid surface (or horizontal plane). The supply port 106 is provided on the inclined surface 100*a*. A first water repellent film S1 is formed on a portion of the plug portion 105C inserted into the hollow cylindrical portion 106*a*. A second water repellent film S2 is formed on the inner wall surface of the hollow cylindrical portion 106*a*. A second water repellent film S2 and a third water repellent film S3 are formed in a region adjacent to a supply port 106 of the inclined surface 100*a*. The water repellent treatment described in the first embodiment can be applied to the formation of the first water repellent film S1, the second water repellent film S2, and the third water repellent film S3.

As shown in FIG. 7C, the inclined surface 100*a* has a first region R1 above the lowermost end of the supply port 106 and a second region R2 below the lowermost end. The second water repellent film S2 is formed on the first region R1. The third water repellent film S3 is formed on the second region R2. The first water repellent film S1, the second water repellent film S2, and the third water repellent film S3 form a water repellent surface R continuous along the inner wall surface of the storage chamber 100 in a state where the entire of the plug portion 105C is inserted into the hollow cylindrical portion 106*a*. In this embodiment, as in the first embodiment, since the suppression of the adhesion of the liquid to the plug member 105 is given priority, the relationship of the water repellency (water repellent property) of the first water repellent film S1, the second water repellent film S2, and the third water repellent film S3 is S1≥S2 and S1≥S3. From the viewpoint of ease of production, the relationship of water repellency is preferably S1>S2 and S1>S3. Further, in the present embodiment, the relationship of the water repellency (water repellent property) between the second water repellent film S2 and the third water repellent film S3 is S2≥S3 (Preferably, S2>S3). This is because the liquid on the water repellent surface R falls (or slips) positively in the gravity direction (downward direction).

According to a liquid storage container 16 of the present embodiment, in addition to the effects described in the first embodiment, the following effects are achieved. If the water repellency of the second water repellent film S2 and the third water repellent film S3 are made too low, liquid may stay on the water repellent surface R. In the present embodiment, by making the water repellency of the second water repellent film S2 positioned above the lowermost end of the supply port 106 higher on the inclined surface 100*a*, the liquid can be dropped (or slid down) positively in the gravity direction. Further, the water repellency of the third water repellent film S3 positioned below the lowermost end of the supply port 106 is made low. Thereby, the liquid on the water repellent surface R can be dropped (or slid) positively in the gravity direction (downward direction), and the liquid can be surely suppressed from staying in the peripheral part of the supply port 106.

Also in the liquid storage container 16 of the present embodiment, the configuration and variations described in the first embodiment can be applied.

Modification Example

Figure 8A:
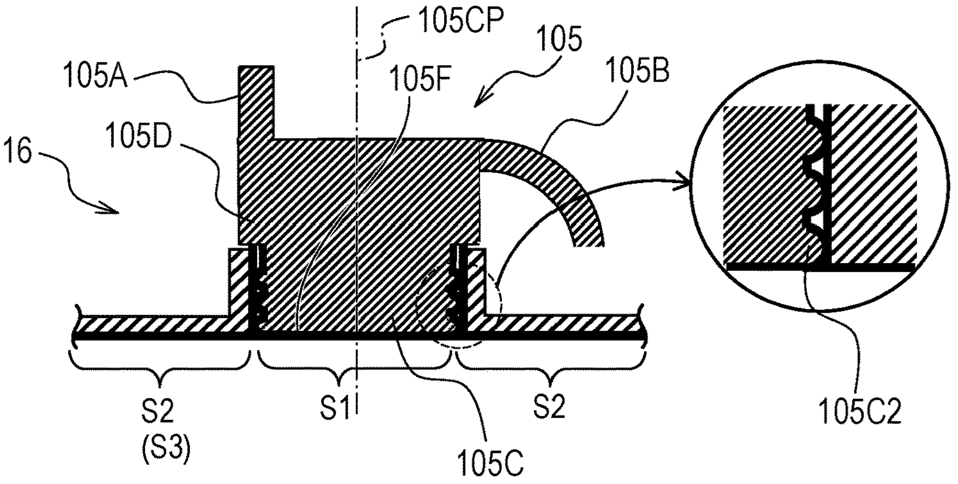
FIGS. 8A, 8B and 8C are schematic diagrams for explaining modifications of a plug member.

Hereinafter, a modification example of a liquid storage container 16 of the first and second embodiments will be described. FIG. 8A shows a configuration of a first modification example of a plug member 105. The plug portion 105C has a lip portion 105C2 on the outer periphery of a part inserted into a supply port 106. The lip portion 105C2 is a protrusion protruding from the side surface and extends along the circumferential direction. Three rows of lip parts 105C2 are provided at predetermined intervals from the tip side of the plug portion 105C. Each lip portion 105C2 is brought into contact with the inner wall surface of the supply port 106 and elastically deformed to seal the supply port 106. The width and height of each lip portion 105C2 are the same. The first water repellent film S1 is formed on the side surface of the plug portion 105C including the lip portion 105C2. Note that the number of rows of the lip portion 105C2 is not limited to 3, and may be 1 or 2 or more as long as sealing is possible.

Figure 8B:
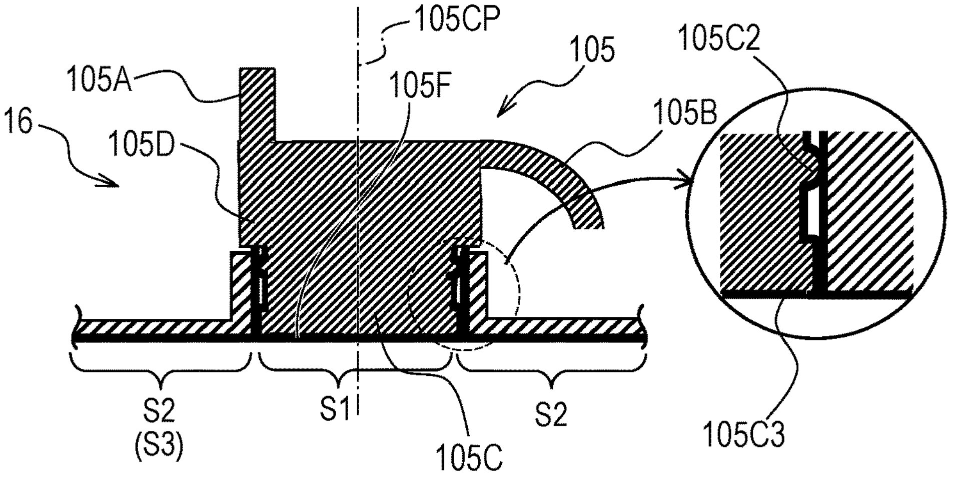

FIG. 8B shows a configuration of a second modification example of a plug member 105. The plug portion 105C has two of a lip portion 105C2 and a lip portion 105C3 provided at predetermined intervals along the circumferential direction on the outer periphery of a portion to be inserted into the supply port 106. The lip portion 105C2 is the same as that of the first modification example. The lip portion 105C3 is positioned closer to the tip side of the plug portion 105C than the lip portion 105C2. The lip portion 105C3 is higher and wider than the lip portion 105C2. As the width of the lip portion increases, the contact surface contacting with the inner wall surface of the supply port 106 increases, and the sealing property is improved. The higher the lip portion is, the greater the crush amount and the better the sealing ability. In this modification example, the sealing performance of the lip portion 105C3 located at the distal end side of the plug portion 105C is higher than that of the lip portion 105C2. The first water repellent film S1 is formed on the side surface of the plug portion 105C including the lip portion 105C2 and the lip portion 105C3.

Figure 8C:
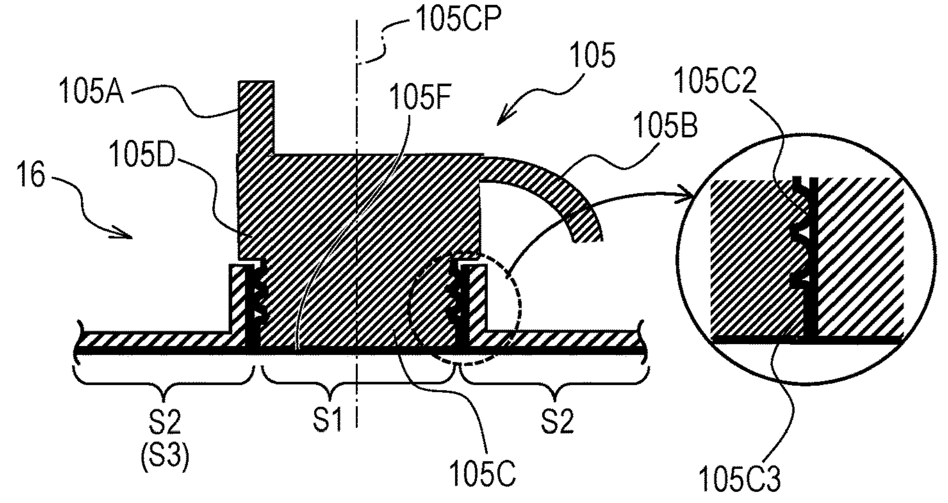

FIG. 8C shows a configuration of a third modification example of a plug member 105. The plug portion 105C has two rows of lip portions 105C2 and one row of lip portion 105C3 provided along the circumferential direction on the outer periphery of a part to be inserted into the supply port 106. The lip portion 105C2 is the same as that of the first modification example. The lip portion 105C3 is the same as that of the second modification example. Even in this modification example, the sealing performance of the lip portion 105C3 positioned at the distal end side of the plug portion 105C is high. The first water repellent film S1 is formed on the side surface of the plug portion 105C including the lip portions 105C2 and the lip portion 105C3. In the first to third modification examples described above, if the supply port 106 can be sealed, the height and width of the lip portion and the number of rows of the lip portion can be appropriately changed.

Figure 9A:
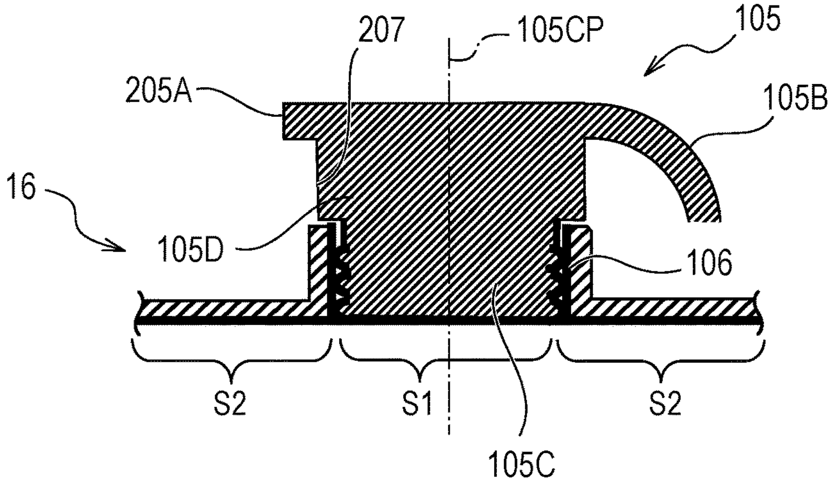
FIGS. 9A, 9B and 9C are schematic diagrams illustrating another variation of a plug member.

FIG. 9A shows a configuration of a fourth modification example of a plug member 105. The plug member 105 includes a projection portion 205A instead of the projection portion 105A. The projection portion 205A projects from the side surface 207 of the cover portion 105D. The projection portion 205A is located on the opposite side to the support portion 105B across the center line 105CP.

Figure 9B:
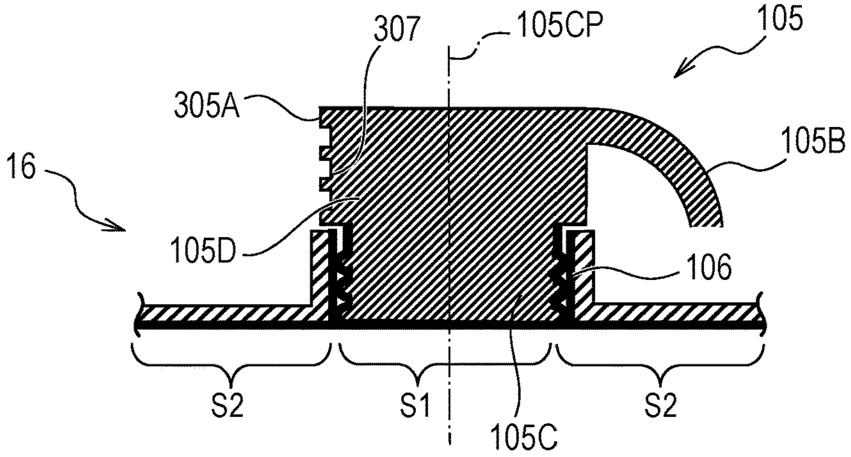

FIG. 9B shows a configuration of a fifth modification example of a plug member 105. The plug member 105 includes a projection portion 305A instead of the projection portion 105A. The projection portion 305A is composed of a plurality of protrusions formed on a side surface 307 of the cover portion 105D and extending in parallel to each other in the circumferential direction. The projection portion 305A is located on the side opposite to the support portion 105B across the center line 105CP. When the user detaches the plug member 105 from the supply port 106, the user puts fingers on the side surface 307. Since projection portion 305A acts to increase the frictional force between the finger and the side surface 307, the plug member 105 can be easily detached from the supply port 106.

Figure 9C:
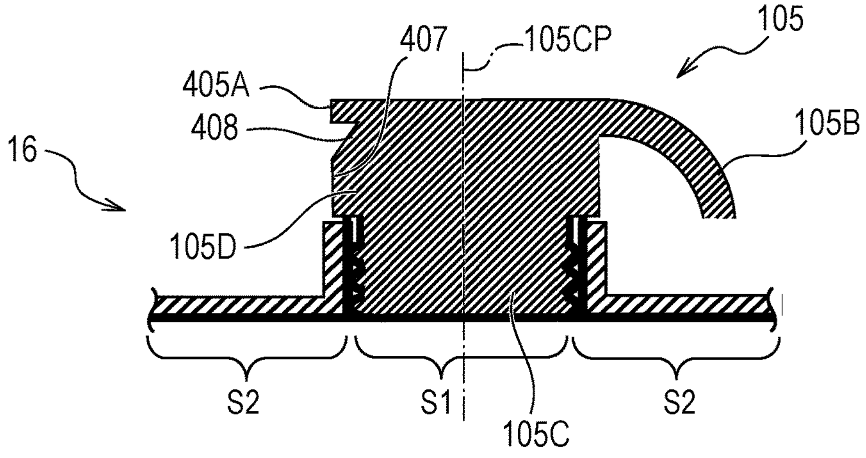

FIG. 9C shows a configuration of a sixth modification example of a plug member 105. The plug member 105 includes a projection portion 405A instead of the projection portion 105A. The projection portion 405A is formed by providing a notch 408 on a side surface 407 of the cover portion 105D. The projection portion 405A is located on the side opposite to the support portion 105B across the center line 105CP. When the user detaches the plug member 105 from the supply port 106, the user puts fingers on the side surface 407. Since projection portion 405A acts to increase the frictional force between the finger and the side surface 407, the plug member 105 can be easily detached from the supply port 106.

Figure 10A:
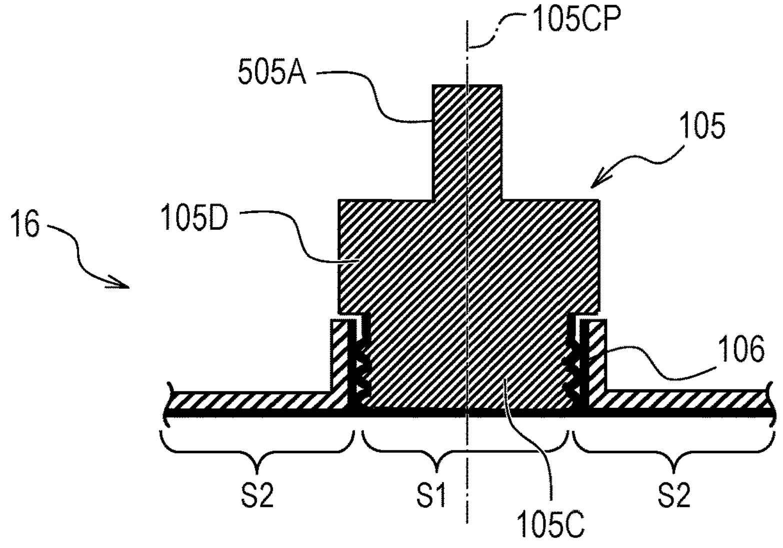
FIGS. 10A, 10B and 10C are schematic diagrams illustrating yet another variation of a plug member.

FIG. 10A shows a configuration of a seventh modification example of a plug member 105. The plug member 105 is provided with a projection portion 505A instead of the projection portion 105A, and does not have a support portion 105B. The projection portion 505A is located at the center line 105CP of the plug member 105 and protrudes upward from the upper surface of the cover portion 105D. The projection portion 505A may have any shape as long as it can be picked. For example, the tip of projection portion 505A may have a protruding shape such as a rectangular parallelepiped, an uneven shape, a spherical shape, or the like.

Figure 10B:
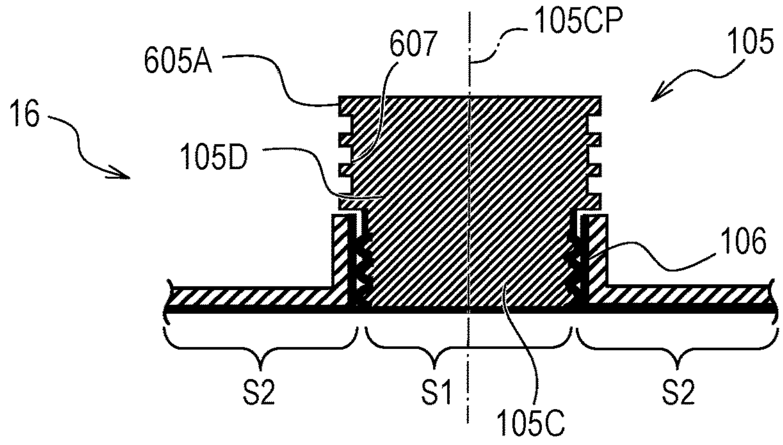

FIG. 10B shows a configuration of an eighth modification example of a plug member 105. The plug member 105 is provided with 2 projection portions 605A instead of the projection portion 105A and does not have the support portion 105B. Each projection portion 605A is composed of a plurality of convex strips formed on the side surface 607 of the cover portion 105D and extending in parallel to each other in the circumferential direction. The respective projection portions 605A are located on opposite sides of the center line 105CP. When detaching the plug member 105 from the supply port 106, the user picks side surfaces 607 from both sides. Since projection portion 605A acts to increase the frictional force between the finger and the side surface 607, the plug member 105 can be easily detached from the supply port 106.

Figure 10C:
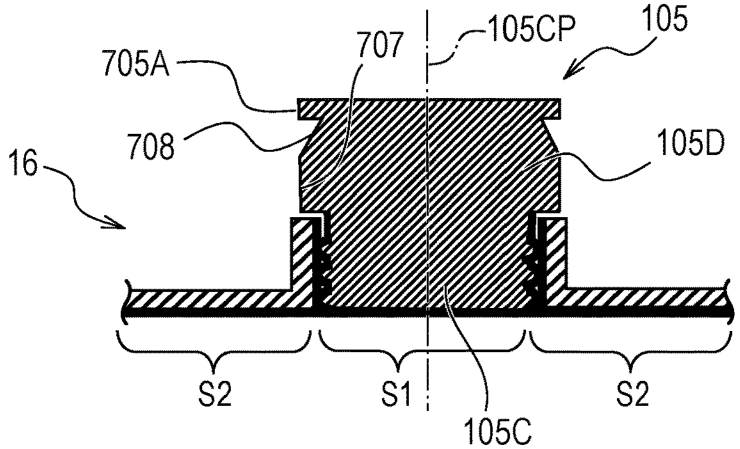

FIG. 10C is a diagram showing a configuration example of a ninth modification of a plug member 105. The plug member 105 is provided with 2 projection portions 705A instead of the projection portion 105A and does not have the support portion 105B. Each projection portion 705 A is formed by providing a notch 708 in a side surface 707 of the cover portion 105D. The respective projection portions 705A are located on opposite sides of the center line 105CP. When detaching the plug member 105 from the supply port 106, the user picks side surfaces 707 from both sides. Since projection portion 705A acts to increase the frictional force between the finger and the side surface 707, the plug member 105 can be easily detached from the supply port 106. In the first to ninth modification examples, the side surface of the cover portion 105D is substantially orthogonal to the opening surface of the supply port 106 in a state where the plug member 105 is attached to the supply port 106.

According to the first to ninth modification examples described above, since the plug member 105 can be detached from the supply port 106 with a smaller force, the recoil or impact generated when the plug member is detached becomes smaller. Therefore, even if the liquid adheres to a plug member 105, scattering of the liquid to the outside can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-026329, filed Feb. 22, 2021, which is hereby incorporated by reference herein in its entirety.

What is claimed is:

1. A liquid discharge apparatus comprising:

a liquid discharge head for discharging liquid;

a liquid storage container for supplying liquid to the liquid discharge head, the liquid storage container including a storage chamber for storing the liquid, a supply portion having a hollow cylindrical portion, and a supply port configured to be capable of supplying the liquid to the storage chamber; and a plug member detachably attached to the supply portion, wherein the plug member has a plug portion inserted into the hollow cylindrical portion to plug the supply port, and a cover portion formed integrally with the plug portion and covering the hollow cylindrical portion from an outside of the storage chamber in a state where the plug portion is inserted into the hollow cylindrical portion, and wherein in a state where the plug portion is inserted into the hollow cylindrical portion, a water repellency of the surface facing the storage chamber is greater than a water repellency of the cover portion.

2. The liquid discharge apparatus according to claim 1, wherein in a state where the plug portion is inserted into the hollow cylindrical portion, among surfaces of the plug portion in the hollow cylindrical portion of the plug portion, a surface opposed to the hollow cylindrical portion has a water repellency greater than a water repellency of the cover portion.

3. The liquid discharge apparatus according to claim 1, wherein a water repellency of an entirety of the portion inserted into the hollow cylindrical portion is greater than the water repellency of the cover portion.

4. The liquid discharge apparatus according to claim 1, wherein the plug member includes:

a support portion which supports a part of the cover portion in a state where the plug member is removed from the supply port; and a protrusion protruding from the cover.

5. The liquid discharge apparatus according to claim 4, wherein the plug portion has a center line coincident with a center line of the hollow cylindrical portion in a state where the plug member is attached onto the storage chamber, and wherein the protrusion is located on a side opposite to the support portion across the center line of the plug portion.

6. The liquid discharge apparatus according to claim 4, wherein one end of the support portion is attached to an upper portion of the cover portion, and the other end of the support portion is attached to the liquid storage container.

7. The liquid discharge apparatus according to claim 1, further comprising a housing portion configured to house the liquid storage container, the housing portion having an openable and closable cover, wherein the liquid storage container housed in the housing portion can provide the liquid from the supply port to the storage chamber in a state where the cover opens.

8. The liquid discharge apparatus according to claim 1, wherein the plug member is formed of a flexible member.

9. The liquid discharge apparatus according to claim 1, wherein the plug portion has a lip portion protruding from a side surface of the plug portion and extending along a circumferential direction.

10. A liquid discharge apparatus comprising:

a liquid discharge head for discharging liquid;

a liquid storage container for supplying liquid to the liquid discharge head, the liquid storage container including a storage chamber for storing the liquid, a supply portion having a hollow cylindrical portion, and a supply port configured to be capable of supplying the liquid to the storage chamber; and a plug member detachably attached to the supply portion, wherein the plug member has a plug portion inserted into the hollow cylindrical portion to plug the supply port, and a cover portion formed integrally with the plug portion and covering the hollow cylindrical portion from an outside of the storage chamber in a state where the plug portion is inserted into the hollow cylindrical portion, and wherein in a state where the plug portion is inserted into the hollow cylindrical portion, a water repellency of a surface of a tip end of the plug portion in a direction along which the plug portion is inserted into the hollow cylindrical portion is larger than the water repellency of the cover portion.

11. A liquid discharge apparatus comprising:

a liquid discharge head for discharging liquid;

a liquid storage container for supplying liquid to the liquid discharge head, the liquid storage container including a storage chamber for storing the liquid, a supply portion have a hollow cylindrical portion, and a supply port configured to be capable of supplying the liquid to the storage chamber; and a plug member detachably attached to the supply portion, wherein the plug member has a plug portion inserted into the hollow cylindrical portion to plug the supply port, and wherein the plug portion has a first water repellent film having water repellency, the first water repellent film being formed on a surface facing the storage chamber in a state where the plug member is inserted into the hollow cylindrical portion.

12. The liquid storage container according to claim 11, wherein in a state where the plug portion is inserted into the hollow cylindrical portion, the plug portion has a second water repellent film having water repellency, the second water repellent film being formed on a surface opposed to the hollow cylindrical portion.

13. The liquid storage container according to claim 11, wherein the first water repellent film is formed over an entirety of the portion inserted into the hollow cylindrical portion.

* * * * *